Patented Aug. 7, 1934

1,969,061

UNITED STATES PATENT OFFICE 1,969,061

COBALT TITANATE AND METHOD OF MAKING SAME

Winfred J. Cauwenberg, Brooklyn, N. Y., assignor to Titanium Pigment Company, Inc., New York, N. Y., a corporation of Maine No Drawing. Application October 29, 1932, Serial No. 640,341

9 Claims. (Cl. 23—50)

My invention relates to titanium pigments and more particularly to new methods for the preparation of cobalt meta-titanate which may be used as a pigment alone or in conjunction with other pigments as a tinting material.

I have discovered that under proper conditions a cobalt titanate possessing a bright green color with high tinting power may be produced. In preparing such improved pigment cobaltous carbonate ($CoCO_3$) is mixed with a neutral titanium oxide pulp obtained by neutralizing the adsorbed or combined acid usually present in the hydrolytically precipitated $TiO_2$ and washing with water to remove the soluble salts. The mixture is then dried at about 95° C. and calcined preferably at 900° C. until the reaction between titanium oxide and cobaltous carbonate to form cobalt meta-titanate is complete, or a product of suitable shade and tinting strength is obtained.

I have also found it desirable to limit the drying temperature to about 95° C. to prevent excessive oxidation with subsequent loss of shade.

The shade of this cobalt titanate pigment may be varied by calcining at a higher temperature, or by increasing the time at a lower temperature. I prefer to conduct our calcination at 900° C. for a period of 3 to 4 hours. As a practical procedure illustrative of my improved methods, I will now give the following example:—

80.1 pounds of titanium oxide as a neutral pulp is mixed with 119 pounds of cobaltous carbonate. The mixture is dried at about 95° C. and immediately calcined at about 900° C. for four hours. If the calcination is to be carried on at a later time the dried material is stored in a closed container. After cooling the cobalt titanate is ground and the resulting pigment produced has a bright yellowish green color.

I have also found that a blue-green pigment may be produced by calcining at about 800° C. from 10 to 24 hours. When the temperature exceeds 900° C., i. e., 925° C., the product is a blue-green with the blue shade developing as the time is increased from 2 to 10 hours. The blue shaded material, while desirable as a pigment, does not possess the brilliancy and tinting strength of the product produced by my preferred method set forth in the example.

I claim as my invention:—

1. A method of making cobalt titanate which comprises mixing a neutral titanium oxide pulp and cobaltous carbonate, drying the mixture, and then calcining the dried mixture.

2. A method of making cobalt titanate which comprises mixing a neutral titanium oxide pulp and cobaltous carbonate, drying the mixture at a temperature not to exceed 95° C., and then calcining the dried mixture.

3. A method of making cobalt titanate which comprises mixing a neutral titanium oxide pulp and cobaltous carbonate, drying the mixture at a temperature not to exceed 95° C., and then calcining the dried mixture at about 900° C. from 3 to 4 hours.

4. A method of making cobalt titanate which comprises mixing a neutral titanium oxide pulp and cobaltous carbonate, drying the mixture, and then calcining the dried mixture from about 800° C. to 925° C.

5. A method of making cobalt meta-titanate which comprises mixing a neutralized hydrolytically precipitated titanium oxide pulp and cobaltous carbonate, drying the mixture at about 95° C., and then calcining the dried mixture from 800° C. to 925° C.

6. A method of making cobalt meta-titanate which comprises mixing a neutralized hydrolytically precipitated titanium oxide pulp and cobaltous carbonate, drying the mixture at about 95° C., and then calcining the dried mixture at about 900° C. from 3 to 4 hours.

7. A yellow-green titanium pigment consisting essentially of cobalt titanate, said pigment having been colored by calcination between 800° and 925° C.

8. A yellow-green titanium pigment consisting essentially of cobalt titanate, said pigment having been colored by calcination at about 900° C.

9. A green titanium pigment consisting essentially of cobalt meta-titanate, said pigment having been colored by calcination at about 900° C. from 3 to 4 hours.

WINFRED J. CAUWENBERG.